United States Patent [19]
Irikura et al.

[11] Patent Number: 5,366,040
[45] Date of Patent: Nov. 22, 1994

[54] BRAKING DEVICE FOR A WORKING VEHICLE

[75] Inventors: Koji Irikura, Hyogo; Atsuo Yoshina, Amagasaki, both of Japan

[73] Assignee: Kanzaki Kokyukoki Mfg. Co., Ltd., Hyogo, Japan

[21] Appl. No.: 137,987

[22] Filed: Oct. 19, 1993

[51] Int. Cl.$^5$ .......................................... B60K 17/354
[52] U.S. Cl. ................... 180/244; 180/24.09; 180/378
[58] Field of Search ............... 180/24.04, 24.09, 244, 180/251, 346, 366, 374, 375, 378; 475/900

[56] References Cited

U.S. PATENT DOCUMENTS

| | | | |
|---|---|---|---|
| 2,771,147 | 11/1956 | Ash | 180/24.04 |
| 2,936,035 | 5/1960 | Hill | 180/244 |
| 3,945,452 | 3/1976 | Klaue | 180/24.09 |
| 4,706,770 | 11/1987 | Simon | 180/24.02 |

FOREIGN PATENT DOCUMENTS 2237081 4/1991 United Kingdom ................ 475/900

*Primary Examiner*—Karin L. Tyson
*Assistant Examiner*—Kevin Hurley
*Attorney, Agent, or Firm*—Sterne, Kessler, Goldstein & Fox

[57] ABSTRACT

The present invention relates to a braking system for an axle driving system for a working vehicle. The braking system comprises disc brake units which are disposed in recesses provided at the right and left sides of a transmission case, and a brake pedal and/or a hand-brake lever which can operate the disc brake units simultaneously. The construction of the present invention results in increased durability and braking capacity. The present invention allows the vehicle to travel in a straight line while stopping, notwithstanding the presence of a differential gear. In addition, the braking device is easily assembled and results in increased support rigidity for the axles.

6 Claims, 10 Drawing Sheets

BRAKING DEVICE FOR A WORKING VEHICLE

BACKGROUND OF THE INVENTION

1. Field of the Invention

The present invention relates to a braking device disposed within a recess of a transmission case which contains an axle driving system for a working vehicle.

2. Prior Art

A conventional working vehicle is disclosed in U.S. Pat. No. 4,706,770 to Simon. This vehicle includes a drive system which transmits power from a prime mover to driven axles through a belt-type non-stage transmission and an axle driving system.

This axle driving system includes a forward-backward travel changeover device, a differential gear, and a front pair of driven axles, all housed within a transmission casing. Sprockets disposed on the axial ends of the front pair of driven axles transmit power through a chain to a rear pair of driven axles.

The forward-backward travel change-over device comprises an input shaft which selectively drives an intermediate shaft either forward through gears or backward through sprockets and a chain. The intermediate shaft drives the front pair of driven axles through a differential gear. The braking system comprises a disc brake disposed at one axial end of the intermediate shaft.

The disc brake is disposed along the drive route before the differential gear. As a result, the differential gear may operate while the brake is being applied if the loads on the axles are different. For example, if the brake is applied while traversing a slope, the differential gear tends to cause the vehicle to turn. Previous attempts to solve this problem provide a differential locking device disposed on the rear pair of axles, which locks the axles together during braking, making them rotate in unison. However, the durability and braking capacity of conventional solutions, such as differential locking devices, is less than optimal.

SUMMARY OF THE INVENTION

The present invention relates to a braking system for a working vehicle. The object of the present invention is to create a braking system that has better durability and braking capacity than previous systems. The braking system of the present invention enables the vehicle to stop without a tendency to turn, notwithstanding the presence of a differential gear. In addition, the braking system of the present invention is easier to assemble than the prior art, and also increases the support rigidity of the axles.

BRIEF DESCRIPTION OF THE DRAWINGS

The foregoing and other objects, features and advantages of the present invention should become apparent from the following description when taken in conjunction with the accompanying drawings, in which.

DESCRIPTION OF THE PREFERRED EMBODIMENT

Figure 1:
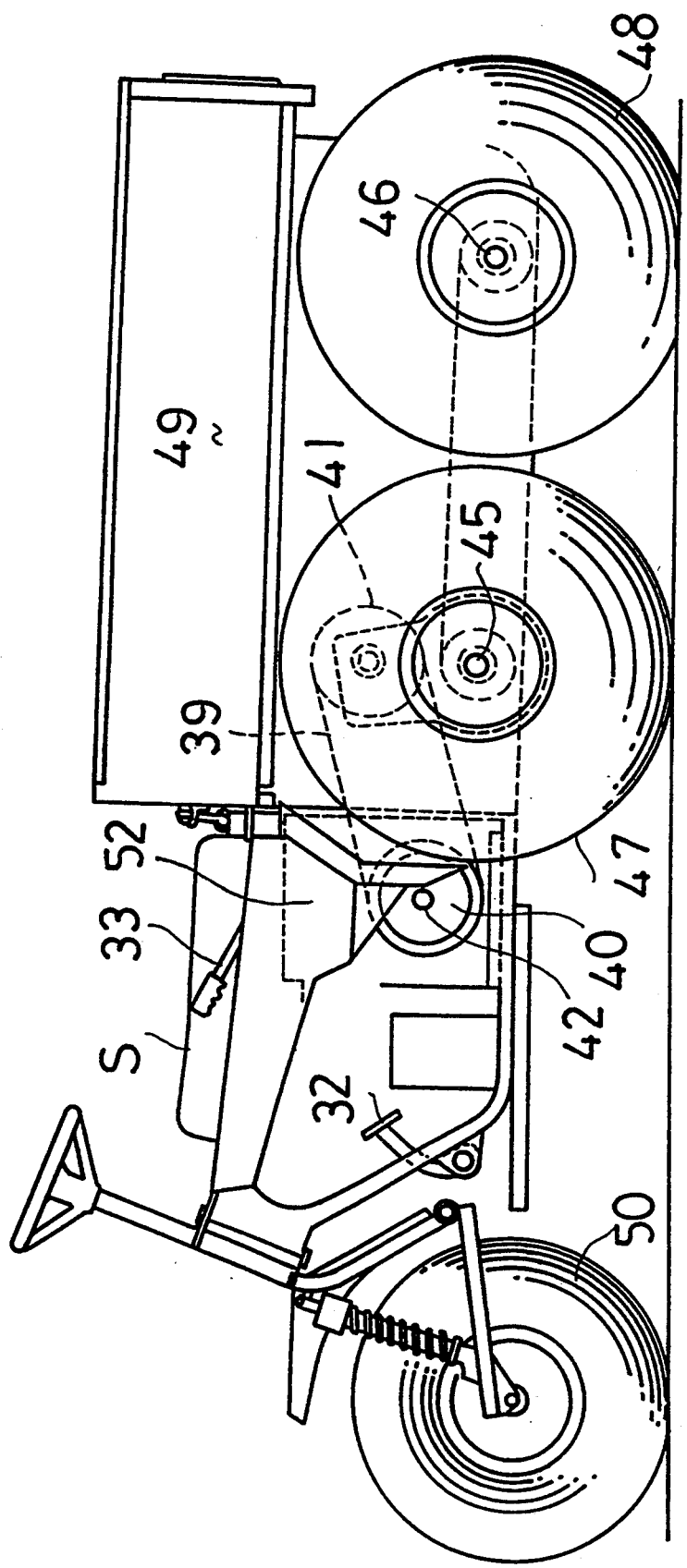
FIG. 1 is a side view of a working vehicle equipped with an axle driving system and a braking device.

FIG. 1 is a side view of a working vehicle with an axle driving system equipped with a braking device of the present invention. A front wheel 50 steers the vehicle. Two pairs of rear wheels, front drive wheels 47 and rear drive wheels 48, are driven by a pair of front driving axles 45 and a pair of rear driving axles 46, respectively.

A load carrying platform 49 is disposed on a vehicle body frame 54 above front drive wheels 47 and rear drive wheels 48. A seat S is disposed between front wheel 50 and front driving wheels 47. A brake pedal 32 is disposed to the left and below seat S. A hand brake lever 33 is also disposed to the left of seat S.

A prime mover pulley 40 is fixed to a prime mover shaft 42. Prime mover shaft 42 is disposed in a compartment 52 under seat S. Prime mover pulley 40 transmits driving power to a speed change pulley 41 through a V-belt 39. Speed change pulley 41 and prime mover pulley 40 can have different diameters, resulting in a drive ratio different than 1:1 between the two pulleys.

Figure 2:
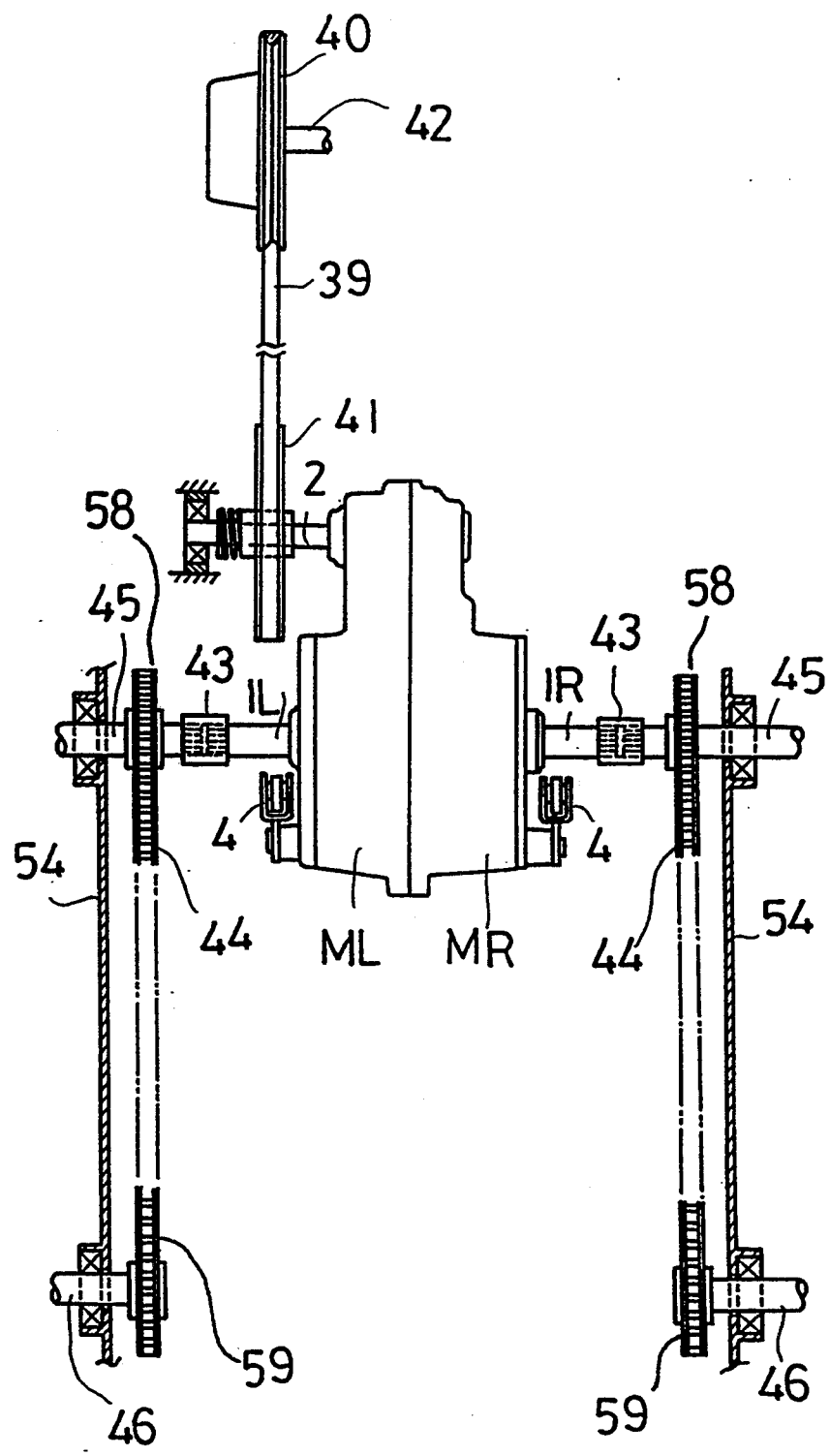
FIG. 2 is a plan view of the driving system between a prime mover shaft and front and rear drive axles.

FIG. 2 shows a how power is transmitted from prime mover shaft 42 to driving axles 45 and 46. Speed change pulley 41 is fixed to an input shaft 2, which projects from a transmission case ML. Transmission case ML is coupled to transmission case MR. Within transmission cases ML and MR, input shaft 2 drives a pair of output shafts 1L and 1R which project laterally from transmission cases ML and MR respectively. Front driving axles 45 are connected to the output shafts 1L and 1R through joints 43.

Front driving axles 45 and rear driving axles 46 are journalled to body frame 54. Front driving axles 45 transmit power through sprockets 58, chain 44, and sprockets 59 to rear driving axles 46.

Figure 3:
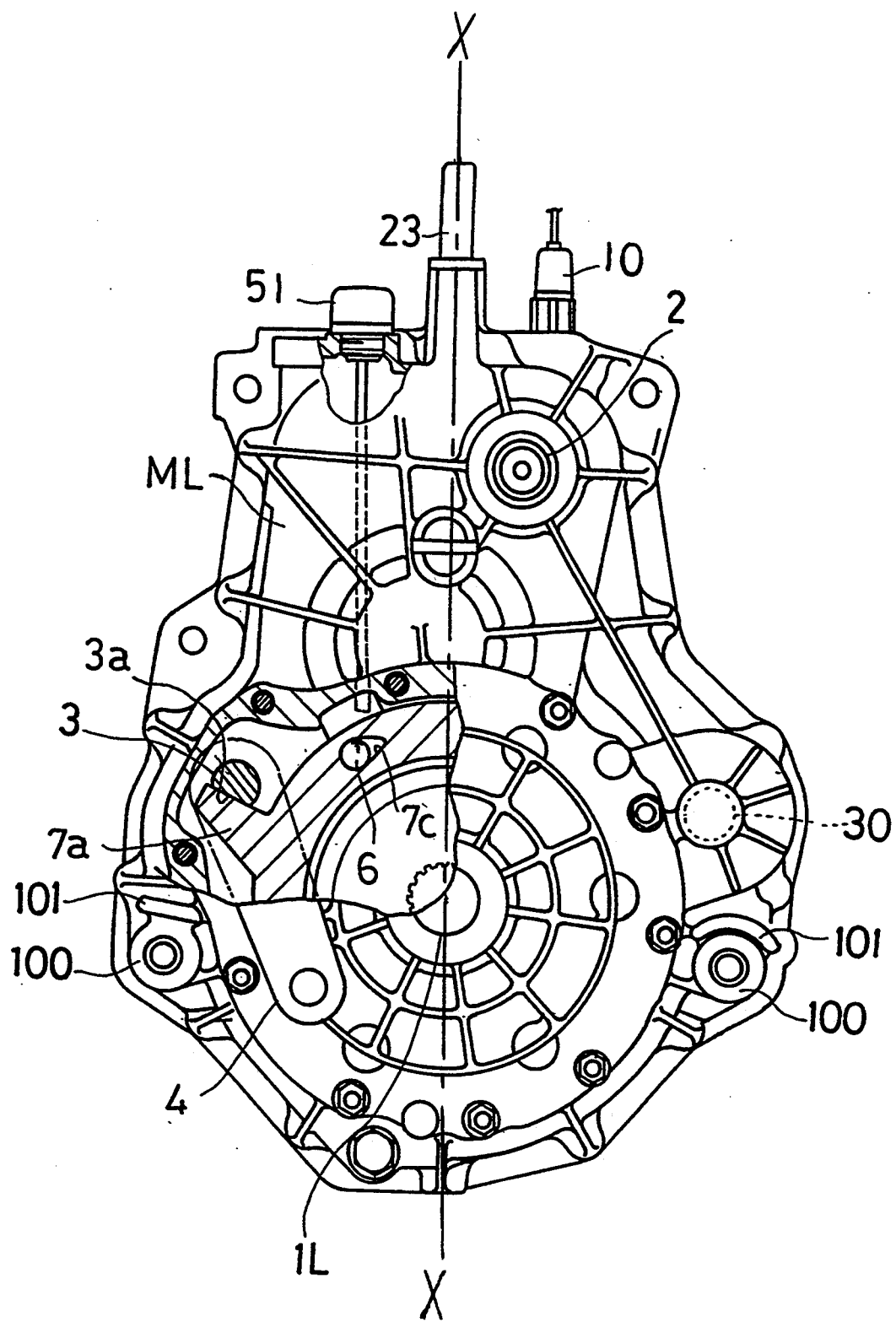
FIG. 3 is a side view of the axle driving system.
Figure 4:
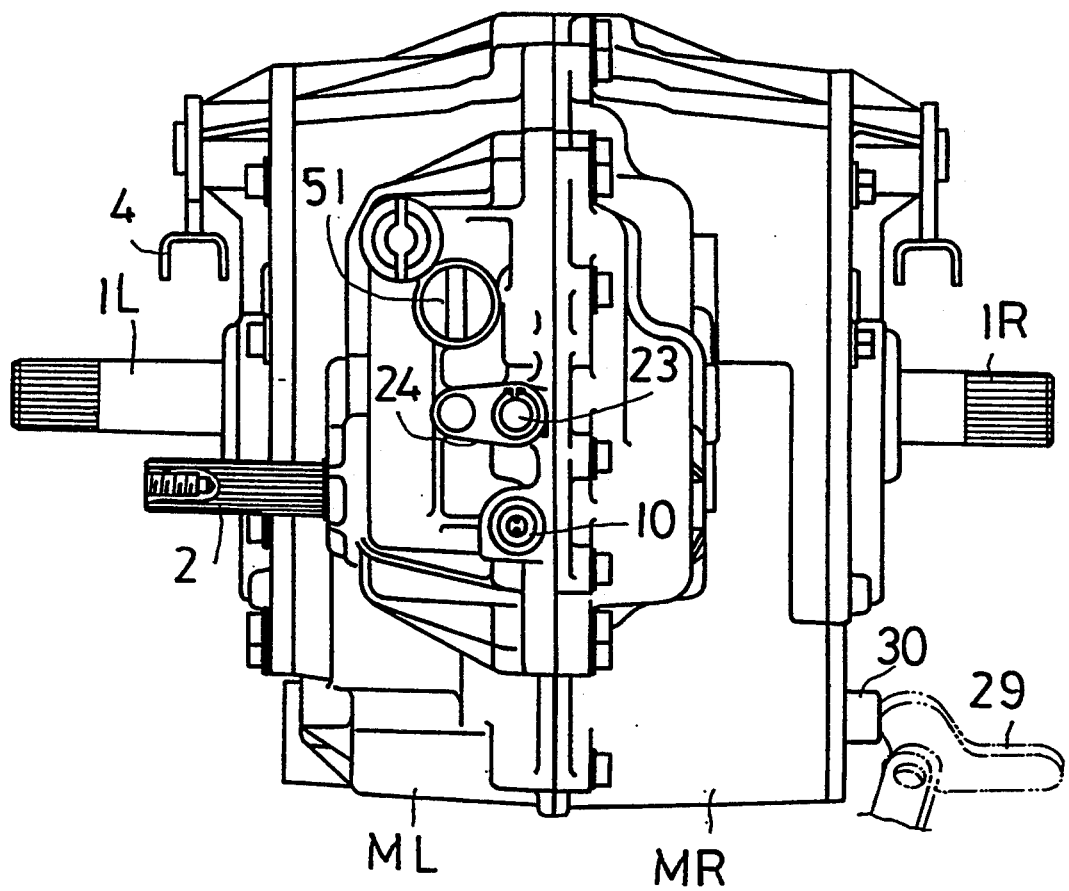
FIG. 4 is a plan view of the same.
Figure 5:
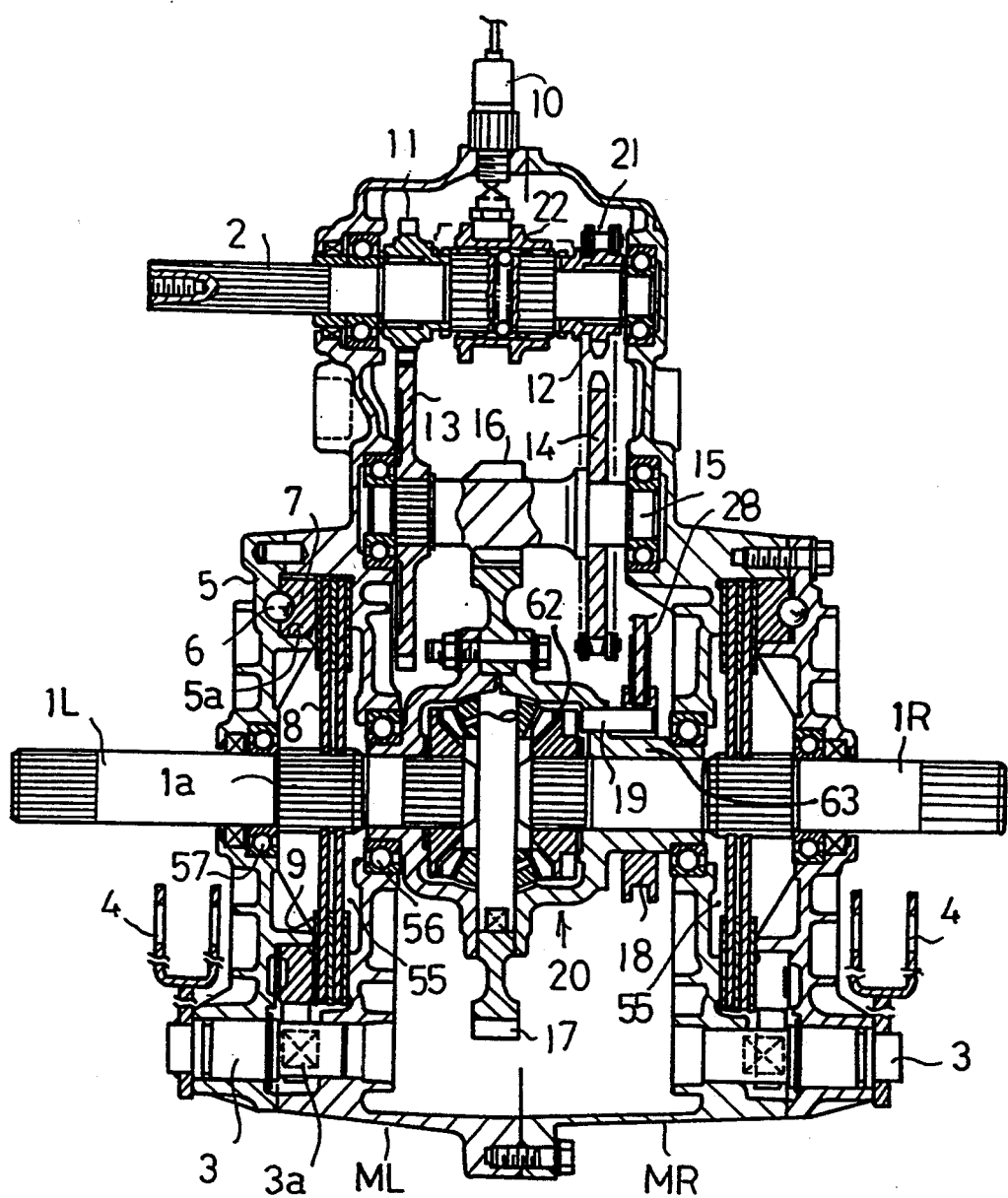
FIG. 5 is a sectional rear view of the same.

FIGS. 3, 4, and 5 show the axle driving system is disposed within transmission cases ML and MR. Specifically, input shaft 2 is journalled to transmission cases ML and MR. A forward gear 11 and a backward sprocket 12 are freely fitted on the input shaft 2. A forward-backward travel changeover element 22 is spline coupled to input shaft 2, and selectively engages either forward gear 11 or backward sprocket 12 with input shaft 2.

Forward gear 11 permanently engages with a gear 13 fixed to counter shaft 15. Backward sprocket 12 is permanently engaged with a sprocket 14 fixed to counter shaft 15 through a chain 21. When forward-backward travel change-over element 22 engages forward gear 11 with input shaft 2, input shaft 2 drives counter shaft 15 in the forward direction through gears 11 and 13. When forward-backward travel change-over element 22 engages backward sprocket 12 with input shaft 2, input shaft 2 drives counter shaft 15 in the backward direction through sprockets 12 and 14 and chain 21.

A gear 16 is fixed to counter shaft 15 and engages with a ring gear 17 of a differential gear 20. The rotation of counter shaft 15 is transmitted to left and right output shafts 1L and 1R by ring gear 17 and differential gear 20. Differential gear 20 can be locked by a differential lock slider 18 and a differential lock pin 19, making output shafts 1L and 1R integrally rotatable.

Transmission oil can be changed through oil change plug 51.

Figure 6:
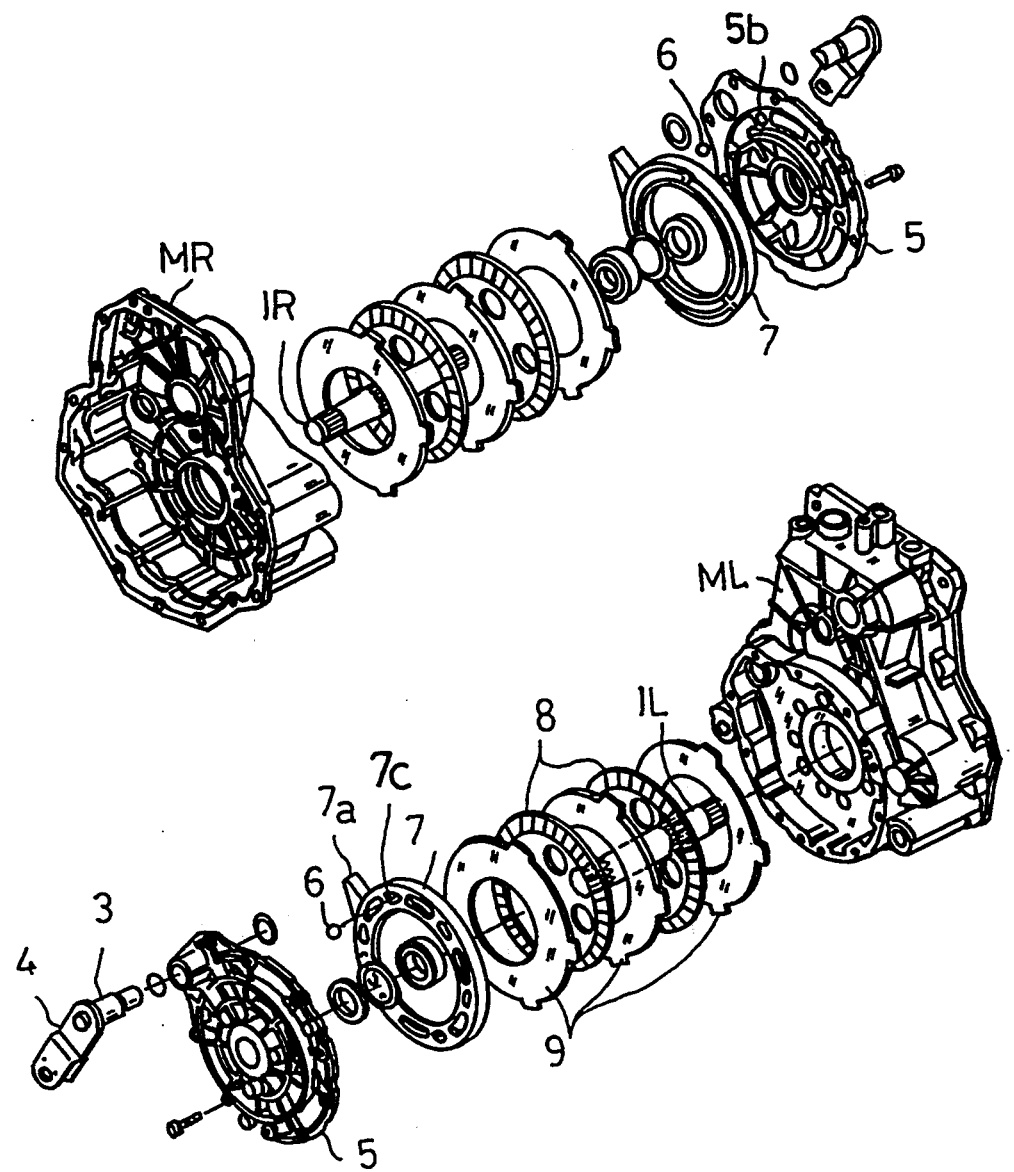
FIG. 6 is a perspective view of a brake operating mechanism.

FIGS. 3, 5, and 6 show the braking device for output shafts 1L and 1R of the present invention. The following description is directed to the left brake, but also applies to the right brake. A recess 55 is formed on the outside transmission cases ML. An actuator 7, a drive side friction plate 8, and a brake side friction plate 9, are disposed within recess 55. Recess 55 is covered by a lid 5, so that the output shafts 1L and 1R and brake cam shafts 3 perforate lid 5 and project outwardly.

Output shaft 1L is journalled to transmission case ML by first bearing means 56, and protrudes from transmission case ML into recess 55. Output shaft 1L extends through recess 55, and is journalled to lid 5 by second bearing means 57.

A brake cam shaft 3 is journalled through lid 5. One axial end of brake cam shaft 3 is rotatably supported by transmission case ML. A brake cam 3a is formed on the part of brake cam shaft 3 that extends into recess 55. A brake arm 4 is fixed to the part of brake cam shaft 3 that projects outward from lid 5.

Drive side friction plates 8 are engaged with output shaft 1L by spline grooves 1a in output shaft 1L and corresponding spline bores in plates 8. Drive side friction plates 8 are disposed between brake side friction plates 9. Protrusions on the circumference of brake side friction plates 9 are fitted into corresponding grooves along the inner periphery of the recess 55. This arrangement allows drive side friction plates 8 and brake side friction plates 9 to slide in the direction of the axis of output shaft 1L. However, drive side friction plates 8 rotate integrally with output shaft 1L, while brake side friction plates cannot rotate relative to transmission case ML about the axis of output shaft 1L.

When actuator 7 is not actuated by a thrust generating mechanism as discussed below, friction is not generated between brake side friction plates 9 and drive side friction plates 8, and output shafts 1L and 1R and their associated friction plates 8 are freely rotatable.

Next, the thrust generating mechanism for biasing brake side friction plates 9 and drive side friction plates 8 against each other through actuator 7 will be explained. Actuator 7 is annular in shape, and fits into a cylindrical groove 5a in lid 5. A projecting engaging portion 7a of actuator 7 abuts against brake cam 3a. When brake arm 4 rotates brake cam shaft 3, the brake cam 3a pushes projecting engaging portion 7a, causing actuator 7 to rotate around output shaft 1L. Actuator 7 is separated from lid 5 by a cam member 6, which is held fixed relative to lid 5 by a holding bore 5b. Cam member 6 also abuts against a cam groove 7c in actuator 7. In one embodiment, cam member 6 is a steel ball, and cam groove 7c is shaped substantially like a teardrop, as shown by FIG. 3. As brake cam 3a rotates actuator 7, cam member 6 abuts against a shallower part of cam groove 7c, forcing actuator 7 farther away from lid 5 along the axis of output shaft 1L, toward drive side friction plates 8 and brake side friction plates 9. Actuator 7 then presses drive side friction plates 8 against brake side friction plates 9, resulting in friction which brakes the rotation of drive side friction plates 8 and output shaft 1L.

Figure 7:
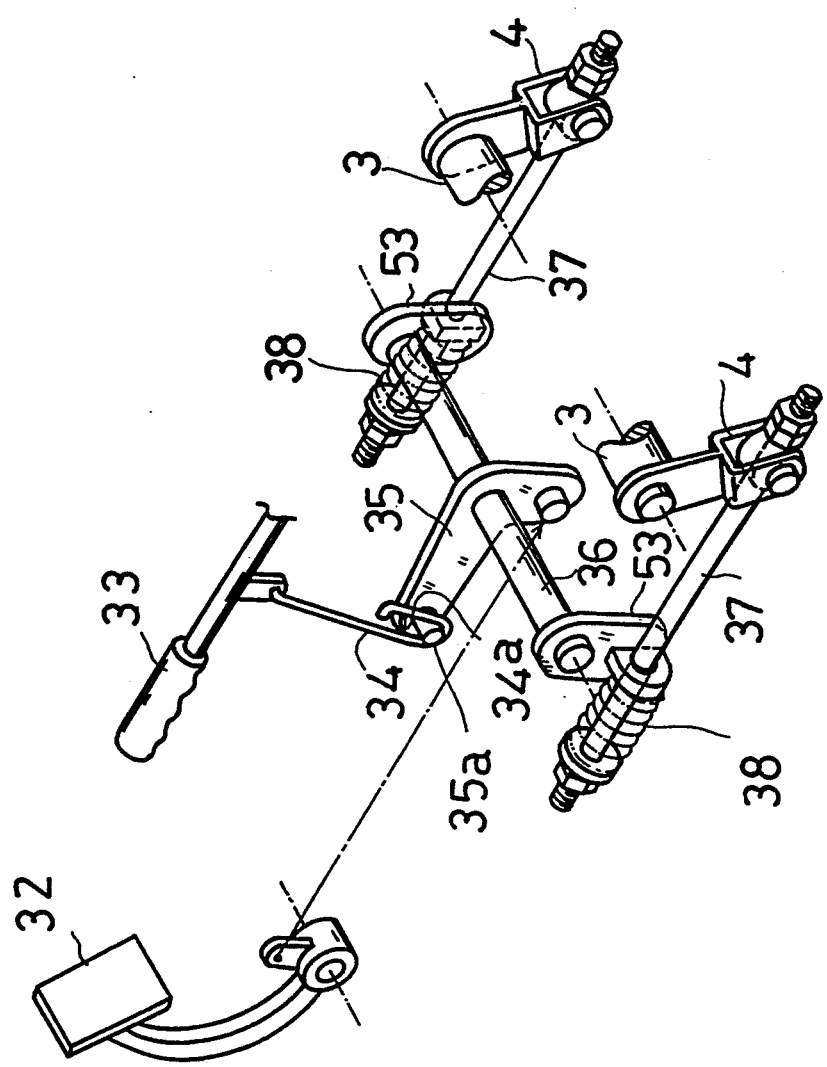
FIG. 7 is a sectional rear view of the axle driving system showing a differential locking mechanism.

FIG. 7 shows the mechanism used by the operator to operate the brake. Brake pedal 32 is operably connected to an arm 35 by a rod, a wire or the like (not shown). Hand brake lever 33 is connected to an engaging pin 35a protruding from arm 35 by means of a slot shaped link 34. When hand brake lever 33 is in the non-braking position, engaging pin 35a can move vertically within a slot 34a, so that brake pedal 32, when depressed, can move arm 35 free from interference by hand brake lever 33 and slot shaped link 34. As a result, the operator can use either brake pedal 32 or hand brake lever 33 to rotate arm 35 about the axis of a rotary shaft 36.

Arm 35 is fixed to rotary shaft 36, as are a pair of arms 53. A pair of links 37 project through holes in arms 53. Links 37 are operably connected to arms 53 by a pair of biasing springs 38 which are sleeved around links 37. Links 37 are also attached to brake arms 4.

When the operator either depresses brake pedal 32 or pulls hand brake lever 33, arm 35 and rotary shaft rotate about the axis of rotary shaft 36. Arms 53, fixed to rotary shaft 36, also rotate. The rotation of arms 53 moves links 37 through biasing springs 38, causing brake arms 4 and brake cam shafts 3 to rotate about the axis of brake cam shafts 3, actuating the brake as described above.

The embodiment set forth above has several advantageous features. The operator is able to simultaneously operate all of the brakes by depressing a single pedal or pulling a single handle. In addition, any excessive operating force of brake pedal 32 is absorbed by biasing springs 38, preventing damage to the braking unit and other nearby parts. Furthermore, as seen from FIG. 3, brake cam shafts 3 and a shifter shaft 30 are mounted to transmission cases 1L and 1R at positions substantially symmetrical about a vertical imaginary line X—X running through output shafts 1L and 1R, resulting in a compact transmission.

Figure 8:
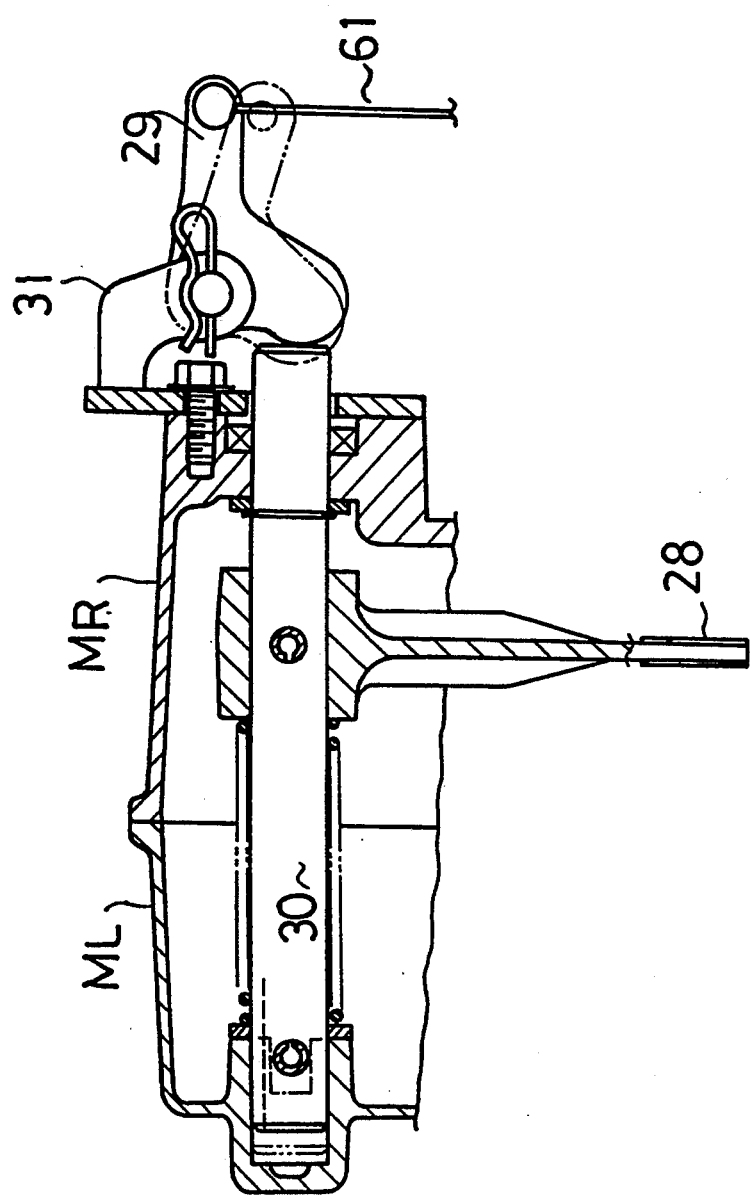
FIG. 8 is a sectional side view of part of a forward-backward travel speed change mechanism of the axle driving system.

FIGS. 5 and 8 show how differential lock slider 18 is operated. A control mechanism (not shown) controls the position of a wire 61. Wire 61 is attached to a biasing arm 29 which pivots around a bracket 31, and abuts against a shifter shaft 30. Differential lock pin 19 is fixed to differential lock slider 18 which is fixed to a differential lock shifter 28 which is in turn fixed to shifter shaft 30. When wire 61 is pulled, biasing arm 29 rotates about bracket 31 and depresses shifter shaft 30. When shifter shaft 30 moves, differential lock pin locks a differential side gear 62 to a differential case 63, making output shafts 1L and 1R integrally rotatable.

Figure 9:
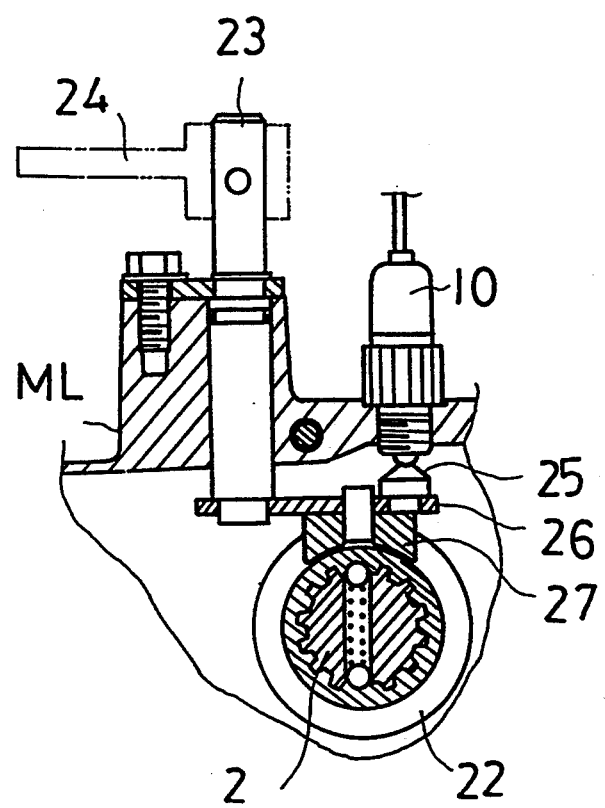
FIG. 9 is a perspective exploded view of a pair of transmission cases and the braking device.

FIGS. 5 and 9 show how forward-backward travel change-over element 22 is operated. A forward-backward travel speed-change arm 24 rotates a forward-backward travel speed-change lever shaft 23, which controls the position of a shifter arm 26 and a shifter pawl 27. Shifter pawl 27 controls the axial position of forward and backward travel change-over element 22 along the axis of input shaft 2. The axial position of forward and backward travel change-over element 22 determines whether forward gear 11 or backward sprocket 12 rotates integrally with input shaft 2 as discussed above.

A forward-backward travel speed-change sensor 10 senses movement of shifter arm 26. Forward-backward travel speed-change sensor 10 detects when shifter arm 26 is in a neutral position, and operates as a switch so that the axle driving system can only be started when shifter arm 26 is in a neutral position.

Figure 10:
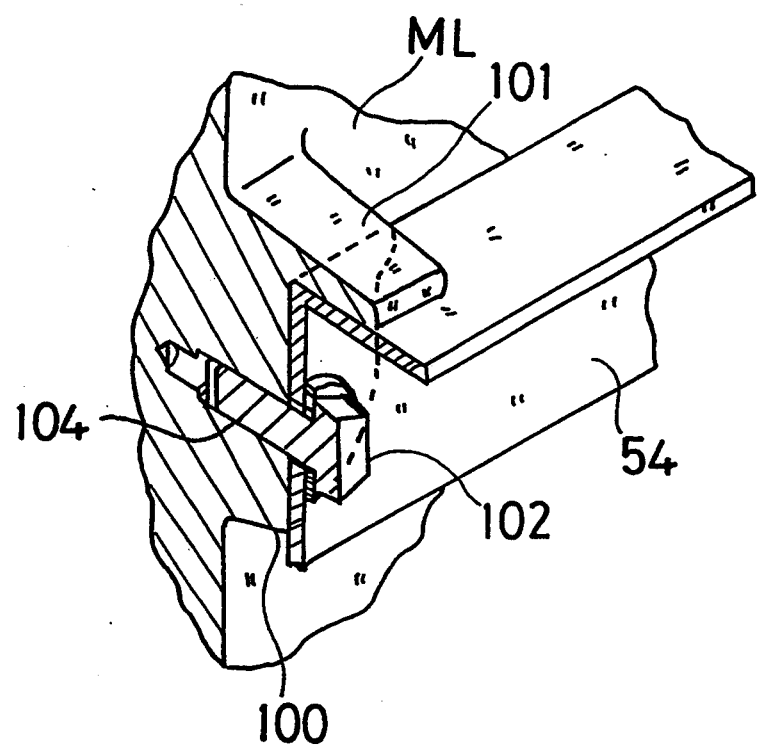
FIG. 10 is a perspective sectional view in part showing the mounting of the transmission case to a body frame.

FIGS. 3 and 10 show the means by which transmission cases ML and MR are mounted onto frame 54. A pair of mounting eyes are positioned underneath brake cam shafts 3 and shifter shaft 30, lower than output shafts 1L and 1R. A projection 101 extends laterally above each mounting eye 100. During assembly, transmission cases ML and MR housing the axle driving system are loaded onto body frame 54 and temporarily supported by projection 101. Transmission cases ML and MR are then slid longitudinally until a threaded bore in mounting eye 100 aligns with a bolt insertion bore 104 in body frame 54. A bolt 102 is then inserted and screwed into the threaded bore in mounting eye 100 and bolt insertion bore 104, completing assembly of the braking device. Using this method facilitates assembly work and reduces labor.

While preferred embodiments have been set forth, various modifications, alterations, and changes may be made without departing from the spirit and scope of tile present invention as defined in the appended claims.

What is claimed is:

1. A braking device for a vehicle comprising:
   a transmission case having right and left side walls;
   a pair of output shafts disposed within said transmission case;
   a differential disposed within said transmission case and coupling said pair of output shafts;
   means for driving said differential disposed within said transmission case;
   a joint provided at an end of each of said output shafts;
   a driving axle coupled with each of said output shafts by said joints;
   a drive wheel driven by each of said driving axles;
   a recess provided in each of said right and left side walils of said transmission case;
   a braking unit disposed in each of said recesses for braking each of said output shafts; and
   a lid covering each of said recesses and said braking units;
   wherein each of said output shafts projects from said transmission case through one of said right and left side walls, one of said recesses, and one of said lids.

2. A braking device for a vehicle according to claim 1, further comprising:
   right and left brake operating members, operably connected to one of said braking units, disposed in said transmission case; and
   a single brake operating element which simultaneously operates said right and left brake operating members.

3. A braking device for a vehicle according to claim 1, wherein each of said braking unit comprises:
   a braking plate supported in each of said recesses;
   a driving plate rotatably connected to each of said output shafts;
   a brake actuator disposed adjacent to said braking plate within said recess; and
   a thrust generating mechanism operably connected to said actuator which causes said actuator to bias said braking plate against said driving plate.

4. A braking device for a vehicle according to claim 3, wherein said thrust generating mechanism comprises:
   a cylindrical groove in each of said lids into which said actuator is fitted, such that said actuator is free to rotate and slide in the direction of an axis of one of said output shafts;
   a brake cam shaft disposed adjacent to said actuator which controls the rotational position of said actuator;
   a holding bore disposed in each of said lids;
   a cam groove disposed on said actuator; and
   a cam member disposed between said holding bore and said cam groove;
   wherein rotation of said actuator causes said cam member to drive said actuator axially along said output shaft and bias said braking plate against said driving plate.

5. A braking device for a vehicle according to claim 4, wherein:
   said cam member is a ball; and
   said cam groove is shaped such that the depth of said cam groove gradually increases along the length of said cam groove.

6. A braking device for a vehicle according to claim 3, further comprising:
   a first bearing means disposed in each of said right and left side walls of said transmission case for rotatably supporting said output shafts; and
   a second bearing means disposed in each of said lids for rotatably supporting said output shafts;
   wherein said driving plates are coupled to said output shafts between said first bearing means and said second bearing means such that said driving plates are not rotatable relative to said output shafts.

* * * * *

UNITED STATES PATENT AND TRADEMARK OFFICE
CERTIFICATE OF CORRECTION

PATENT NO. : 5,366,040

DATED : November 22, 1994

INVENTOR(S) : Koji Irikura, et al.

It is certified that error appears in the above-indentified patent and that said Letters Patent is hereby corrected as shown below:

Column 5, line 20, change "walils" to --walls--.

Signed and Sealed this

Seventh Day of March, 1995

Attest:

BRUCE LEHMAN

*Attesting Officer*   *Commissioner of Patents and Trademarks*